O. PARÉ.
LEVELING INSTRUMENT.
APPLICATION FILED JAN. 17, 1913.

1,067,753.

Patented July 15, 1913.
2 SHEETS—SHEET 1.

Inventor
Omer Paré

Witnesses
Harrison Ott.
John J. McCarthy

By Victor J. Evans
Attorney

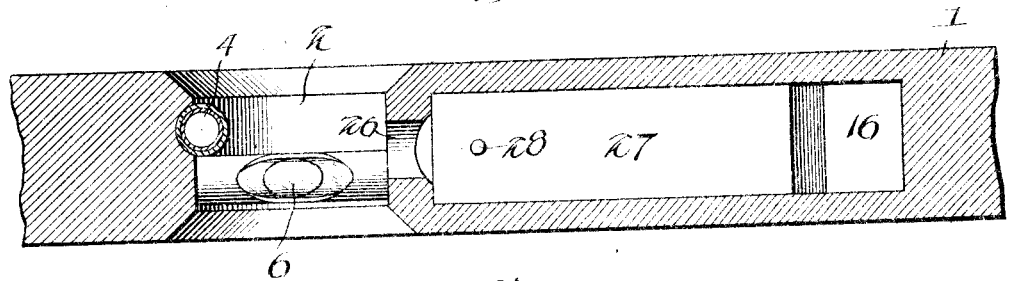
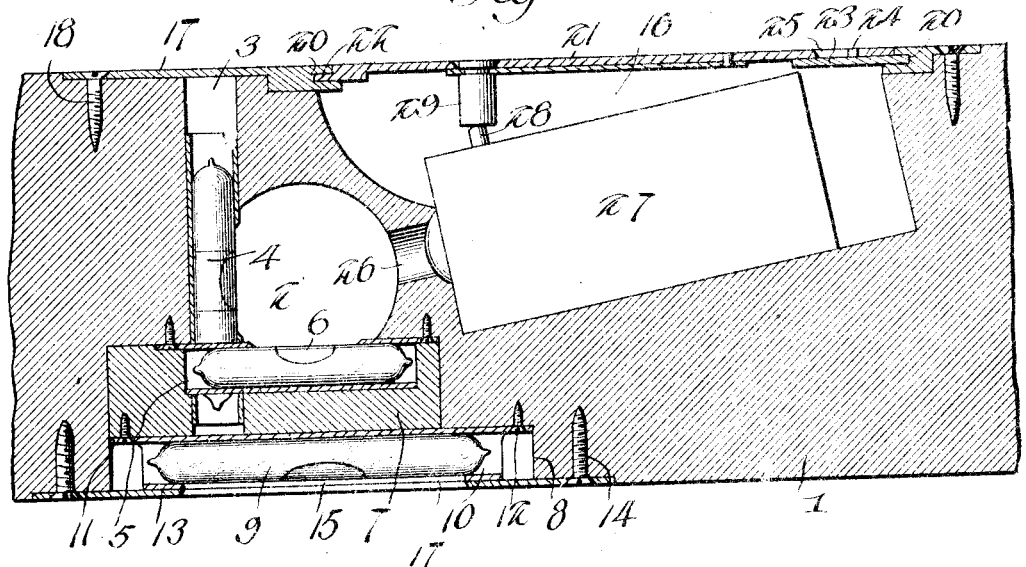
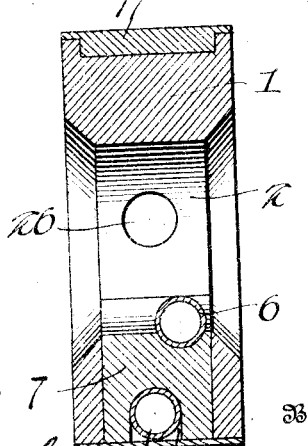

UNITED STATES PATENT OFFICE.

OMER PARÉ, OF SALEM, MASSACHUSETTS, ASSIGNOR OF ONE-TENTH TO ANTOINE R. FOISY, OF SALEM, MASSACHUSETTS.

LEVELING INSTRUMENT.

1,067,753.  Specification of Letters Patent.  Patented July 15, 1913.

Application filed January 17, 1913. Serial No. 742,654.

*To all whom it may concern:*

Be it known that I, OMER PARÉ, a citizen of the United States of America, residing at Salem, in the county of Essex and State of Massachusetts, have invented new and useful Improvements in Leveling Instruments, of which the following is a specification.

This invention relates to improvements in leveling instruments and has particular application to a combined leveling and plumbing device.

In carrying out the present invention, it is my purpose to provide a combined leveling and plumbing instrument wherein the bubbles in the spirit tubes may be illuminated so as to facilitate the use of the device in dark corners and other places lacking a sufficient amount of light.

Furthermore, I aim to provide a leveling instrument wherein a level tube will be arranged within the stock and capable of having light rays projected thereon to render the bubble visible in dark places, while a second level is carried by the stock and visible at one of the edges thereof so that the instrument may be used with ease and facility in the open, the level tubes in either case being clearly visible.

It is also my purpose to provide an instrument of the type set forth which will embrace among other features a stock having a sight opening therein opening upon the sides thereof so that the plumbing and leveling tubes may be viewed, the stock being further provided with a pocket or chamber opening upon one edge thereof and housing a suitable form of lamp whereby the light rays may be projected into the sight opening and upon the spirit tubes, a cover being provided for the pocket or chamber and is detachably associated with the stock so that the lamp may be removed when such is desired.

A further object of the invention is the provision of a combined leveling and plumbing instrument which will embrace the desired features of simplicity, efficiency, durability and convenience and which will be conducive to economy in manufacturing and marketing.

With the above and other objects in view, the invention consists in the construction, combination and arrangement of parts hereinafter set forth in and falling within the scope of the claims.

Figure 1:
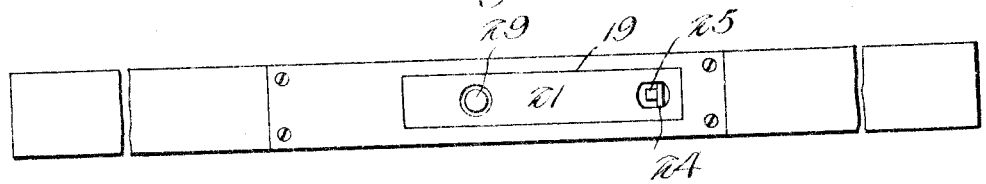
Figure 2:
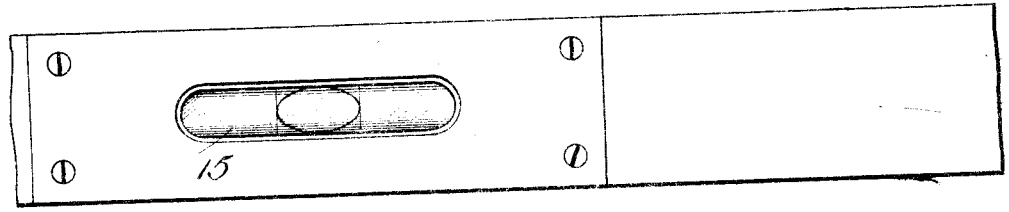
Figure 3:
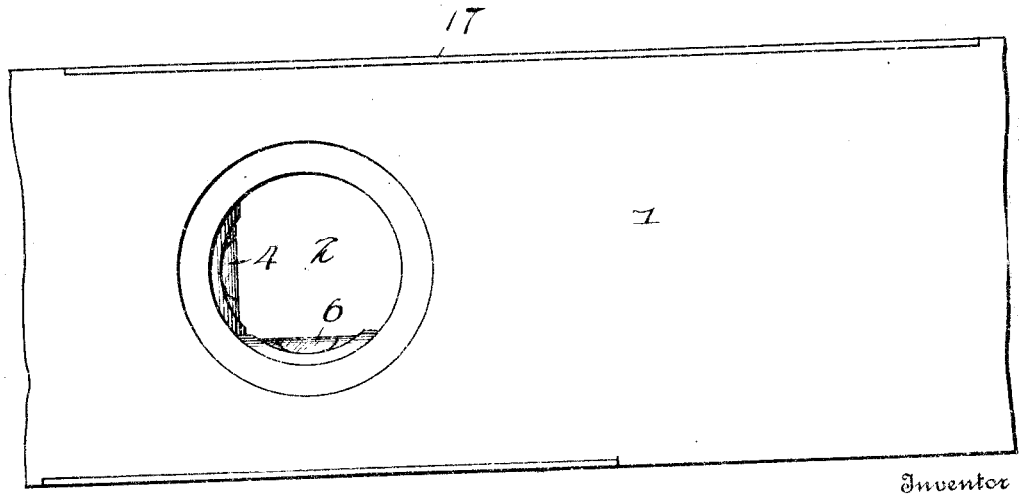

In the accompanying drawings: Figure 1 is an edge view of a combined leveling and plumbing instrument constructed in accordance with the present invention. Fig. 2 is a view in elevation of the opposite edge. Fig. 3 is a side elevation of the instrument. Fig. 4 is a horizontal longitudinal sectional view. Fig. 5 is a vertical longitudinal sectional view, and Fig. 6 is a transverse sectional view.

Referring now to the accompanying drawings in detail, the numeral 1 indicates the stock of the instrument which may be constructed of any suitable material and of any desired or convenient length. Formed in the stock 1 and opening upon the side walls thereof is a sight opening 2 having communication with a bore 3 opening upon one edge of the stock and carrying a spirit tube 4 forming the plumb tube, any suitable means being employed to hold the spirit tube 4 in applied position. Also formed in the stock 1 at one side of the bore 3 is a bore 5 opening into the sight opening at a point at right angles to the bore 3 and receiving a leveling tube 6, suitable means being employed to hold the leveling tube in position. Thus, it will be seen that the plumbing and leveling tubes may be viewed through the sight opening 2. Arranged within the pocket 5 and incasing the sight tube 6 is a filler block 7 forming a portion of one wall of a recess 8 housing a second leveling tube 9 disposed within a metallic casing 10 having its opposite extremities formed to provide ears 11 through which are passed screws or the like 12, the latter being embedded in the material of the adjacent wall of the recess. This leveling tube 9 is visible from one edge of the instrument and covering the open end of the recess 8 is a plate 13 lying flush with the respective edge of the stock and suitably fastened thereto as by screws 14, the plate being provided with an elongated slot 15 by means of which the bubble within the spirit tube may be seen. From this construction, it will be noted that the instrument may be used for leveling purposes with ease and facility when in the open thereby eliminating the necessity of peeping through the sight opening 2 to view the bubble within the tube 6. The stock 1 has also formed therein a chamber 16 opening upon the edge thereof opposite from the leveling tube 9 and provided with a cover composed of a relatively long plate 17 secured to the respective edge of the stock by by means of screws 18 or the like and lying flush with such edge. The plate is formed with a slot 19 opening into the pocket 16, the end walls of the slot in the plate 17 being grooved as at 20.

A second plate 21 is adapted to close the slot in the plate 17 and has one end thereof formed with a lip 22 engageable in the groove 20 at one end of the slot 19, while the opposite end of such second plate carries a movable tongue 23 adapted to be projected into the groove at the opposite end of the slot 19 and equipped with a finger hold 24 extending through an aperture 25 formed in the plate 21 adjacent to this end thereof and forming a slide way for the finger hold so that the tongue 23 may be withdrawn from the respective groove 20 thereby enabling the plate 21 to be removed from the slot 19 so that access may be had to the chamber 16. This chamber 16 has communication with the sight opening 2 by way of a passage 26 and houses a lamp which, in the present instance, is in the form of a self-contained electric lamp 27, that is a lamp embracing a casing containing a bulb and a battery therefor, the usual push button 28 extending outwardly of one side of the casing so that the circuit may be closed to illuminate the filaments of the lamp. This push button 28 is disposed in the path of movement of a plunger 29 slidable within an aperture formed in the plate 21 and adapted when operated to actuate the push button 28 and so close the circuit to the bulb so that the light rays from the lamp may be projected through the passage 26 into the sight opening 2 and upon the plumbing and leveling tubes therein.

From the foregoing description taken in connection with the accompanying drawings, the construction, mode of operation and manner of employing my invention will be readily apparent. When the device is utilized in a dark place such as a corner or the like and it is desired to utilize the instrument as a combined plumb and level, the plunger 29 is actuated to close the circuit to the lamp bulb as hereinbefore described whereby the bubbles within the plumbing and leveling tubes 4 and 6 respectively will be plainly visible through the sight opening 2. On the other hand, should the device be employed in the open and it is desired to ascertain the level of a board or the like, the edge of the stock opposite from the leveling tube 9 is placed upon such board and the level determined by the bubble within the tube 9.

While I have herein shown and described one preferred form of my invention by way of illustration, I wish it to be understood that I do not limit myself to the precise details of construction herein described and delineated, as modification and variation may be made within the scope of the claims and without departing from the spirit of the invention.

I claim:

1. A device of the class described comprising a stock having a sight opening formed therein and opening upon the sides thereof, a chamber formed therein and opening upon one edge thereof and a pocket formed therein and opening upon the opposite edge thereof, spirit tubes within the stock at right angles to each other and having portions within the sight opening, an electric lamp within said chamber and adapted to project the rays of light into the sight opening and upon said tubes, and a tube within said pocket and visible from one edge of the stock.

2. A device of the class described comprising a stock having a sight opening therein, and a chamber formed within the stock and opening upon one edge thereof, spirit tubes within the stock and at right angles to each other and having portions within the sight opening, an electric lamp within said chamber and adapted to project the rays of light into the sight opening and upon said tubes, and a cover closing said chamber and comprising a plate secured to the respective edge of the stock and provided with a slot opening into the chamber, and a second plate closing the slot in the first-mentioned plate and removable therefrom.

3. A device of the class described comprising a stock having a sight opening therein, and a chamber formed within the stock and opening upon one edge thereof, spirit tubes within the stock, and at right angles to each other and having portions within the sight opening, an electric lamp within said chamber and adapted to project the rays of light into the sight opening and upon said tubes, and a cover closing said chamber comprising a plate secured to one edge of the stock and provided with a slot opening into the chamber and having grooved end walls, and a second plate designed to close the slot in the first mentioned plate and having a lip at one end engageable in the adjacent groove, and a movable tongue at the opposite end adapted to be projected into and withdrawn from the respective groove.

In testimony whereof I affix my signature in presence of two witnesses.

OMER PARÉ.

Witnesses:
ANTOINE R. FOISY
ALPHONSE LAVOIE.